United States Patent [19]

Kitamura

[11] Patent Number: 4,697,213
[45] Date of Patent: Sep. 29, 1987

[54] INDEX SERVO TYPE MAGNETIC HEAD POSITIONING CONTROL APPARATUS AND METHOD THEREOF

[75] Inventor: Shunji Kitamura, Hanno, Japan

[73] Assignee: Kabushiki Kaisha Toshiba, Kawasaki, Japan

[21] Appl. No.: 878,696

[22] Filed: Jun. 26, 1986

[30] Foreign Application Priority Data

Jun. 28, 1985 [JP] Japan .................................. 60-142153

[51] Int. Cl.⁴ ............................ G11B 5/55; G11B 5/56
[52] U.S. Cl. ...................................... 360/78; 318/634; 360/77
[58] Field of Search ........................... 360/75, 77, 78; 318/634

[56] References Cited

U.S. PATENT DOCUMENTS 4,122,503 10/1978 Allan ...................................... 360/78
4,136,365 1/1979 Chick et al. ........................... 360/78
4,620,244 10/1986 Krause ................................... 360/77

Primary Examiner—George G. Stellar
Attorney, Agent, or Firm—Finnegan, Henderson, Farabow, Garrett & Dunner

[57] ABSTRACT

According to the invention, a magnetic head positioning control apparatus using an index servo data has a circuit for determining a final correction value such that a magnetic head position correcting operation is repeatedly performed at a designated track position. The apparatus also has a circuit for obtaining final correction values for two different tracks, to calculate a thermal offset value accordingly. A correction current value and a track position can be expressed by a linear relation, and two coefficients of the relation can be determined using the two final correction current values. When an arbitrary track position is designated, a thermal offset value can be determined with reference to the two coefficients of the relation and the designated track position.

16 Claims, 11 Drawing Figures

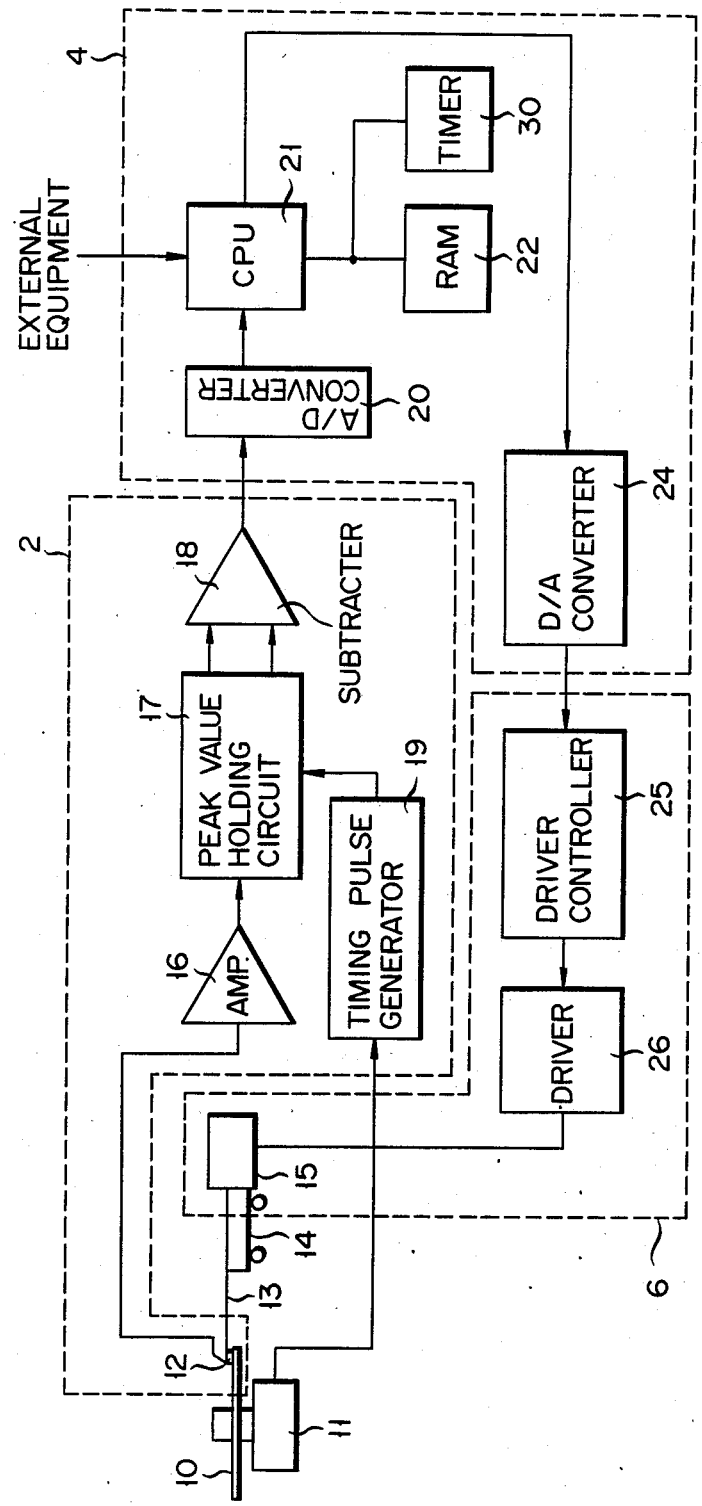
F I G. 1

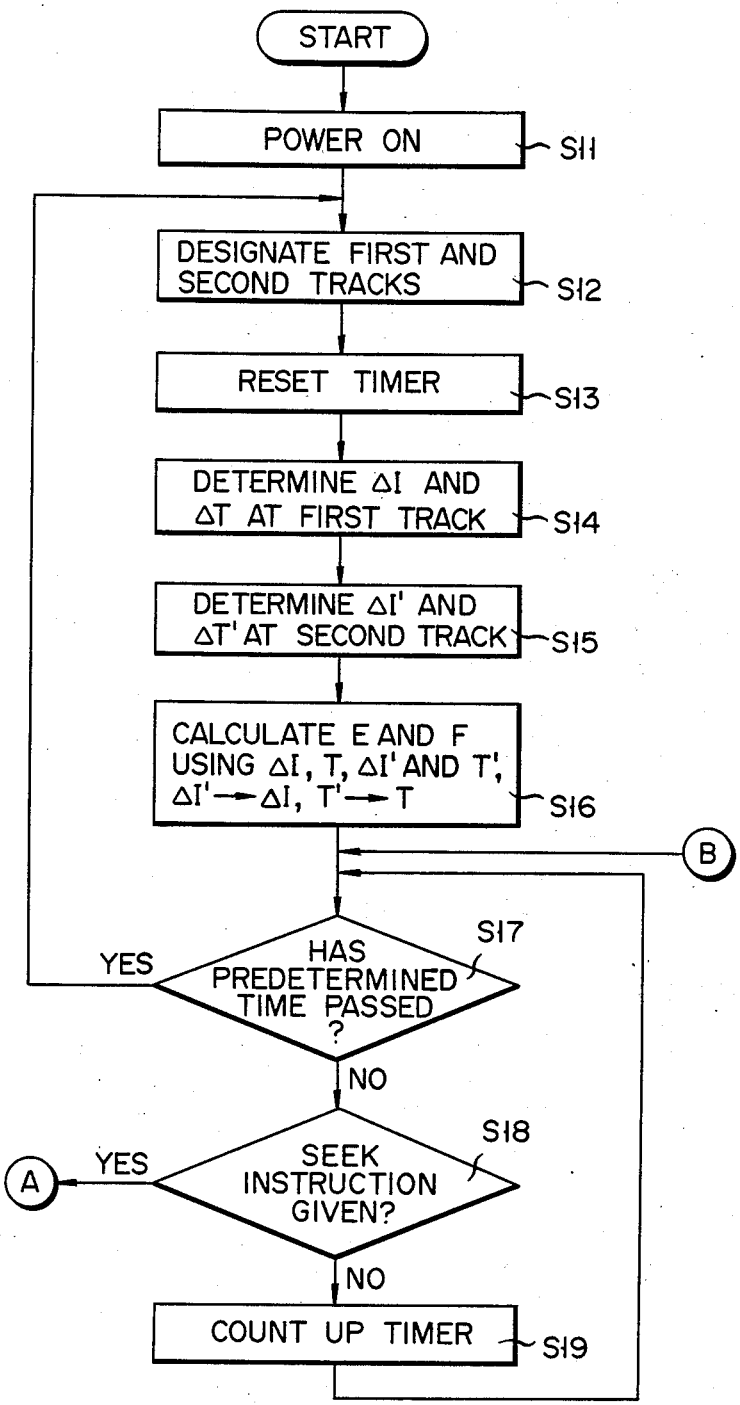

INDEX SERVO TYPE MAGNETIC HEAD POSITIONING CONTROL APPARATUS AND METHOD THEREOF

BACKGROUND OF THE INVENTION

The present invention relates to an index servo type magnetic head positioning control apparatus having a function for correcting thermal off-track in a magnetic disk apparatus, and a method thereof.

In magnetic disk (hard disk) apparatuses, the positional relationship between the magnetic head and a hard disk having a metal base is shifted due to heat, in other wards, a so-called "thermal off-track" phenomenon occurs. For this reason, when the magnetic head seeks a target track position, positional correction must be performed to absorb thermal off-track at the target track position.

In a conventional magnetic head positioning apparatus adopting an index servo method, an amount of thermal off-track is calculated based on servo data (SD) recorded on an index section of a data surface of the hard disk. A positional correction value (to be referred to as a thermal offset value hereinafter) of the magnetic head is determined in accordance with the calculated amount of thermal off-track, and a correction current corresponding to the thermal offset value is supplied to a stepping motor to drive a carriage, thereby executing positional correction of the magnetic head.

In the index servo method, the correction current is determined so that the peak values of servo data SD signals are equal to each other when servo data SD recorded on adjacent tracks are read out by the magnetic head. When the magnetic head is at a wrong position, since the peak values from the servo data differ, the magnetic head positioning operation is repeated, and a new correction current is set until the peak values from the servo data signals are equal to each other.

When the peak values from the servo data are monitored, it can be discriminated whether or not the magnetic head is at the center position of the data track. The amount of off-track of the magnetic head is calculated from the difference between the peak values (difference between voltage levels). The correction current corresponding to the calculated amount is supplied to the stepping motor, which serves as a drive source of the carriage, thereby correcting the magnetic head position.

In the conventional index servo method, since servo data SD is obtained once per rotation, the magnetic head must stand by until it detects the servo data. Therefore, when positional correction must be performed at respective track positions, positioning control takes a great deal of time, resulting in low throughput of the magnetic disk apparatus.

In order to solve the above problem, another method has been proposed wherein a correction value corresponding to an amount of thermal off-track at the target track position is estimated, and magnetic head positioning control is performed based on a correction current corresponding to the estimated correction value. However, the thermal off-track values vary widely with changes in temperature, and it is impossible to accurately determine the thermal offset value for magnetic head positioning control. In addition, the relationship between the peak value difference for servo data SD and the amount of off-track must be constant at the inner and outer track positions of the disk or in individual apparatuses. For this purpose, a precise automatic gain control (AGC) circuit is required, leading to increased cost. In order to keep the relationship between the amount of off-track and the correction current constant in each apparatus, variations in wear of the carriage or in deviation of the stepping motor must be minimized. Therefore, since variations in characteristics of constituents of the magnetic disk apparatus must be minimized and an accurate AGC is required, total cost of the apparatus increases.

SUMMARY OF THE INVENTION

The present invention has been made in consideration of the above situation.

It is an object of the present invention to provide a magnetic head positioning apparatus adopting an index servo method, in which a thermal offset can be corrected even though thermal off-track is not corrected for each disk access instruction. The apparatus comprises:

detecting means for detecting two peak values corresponding to servo data with respect to a current data track position on a disk by a magnetic head, and for outputting data corresponding to a difference between the two peak values;

magnetic head driving means for determining a driving current value according to an input correction current value and for displacing a position of the magnetic head in the current data track position based on the driving current value; and correction value output means for outputting to the magnetic head driving means one of the correction current values according to the data corresponding to the difference to determine a final correction current value at the current track position and the correction current value calculated from a relation between the final correction current value and the track position in response to an input seek instruction, for driving the detecting means in response to an output of the correction current value, and for determining the relation using the final correction current values and the track positions.

It is another object of the present invention to provide a magnetic head positioning control method in an index servo system, in which a thermal offset can be corrected even though thermal off-track is not corrected for each disk access instruction. The method comprises:

performing a first displacement of a magnetic head according to a first calculation of a correction current value in a designated data track position by an input seek instruction using a relation between a final correction current value and the track position;

performing a first determination of a final correction current value at the designated data track position by further displacing the magnetic head in response to a presence of a thermal off track; and performing a second determination of the relation based on the final correction current values.

With the magnetic head positioning control apparatus adopting the index servo method of the present invention, when a seek operation of the magnetic head is completed, a thermal offset value for absorbing thermal off-track at a target track position can be corrected without reading out the servo data at a designated track. Therefore, an effective magnetic head positioning operation can be reliably performed with a simple arrangement.

BRIEF DESCRIPTION OF THE DRAWINGS

FIG. 1 is a block diagram of a magnetic head positioning control apparatus according to an embodiment of the present invention;

FIGS. 7A and 7B are flow charts for explaining processing for correcting a shift in position of the magnetic head due to thermal off-track.

DESCRIPTION OF THE PREFERRED EMBODIMENT

Figure 2:
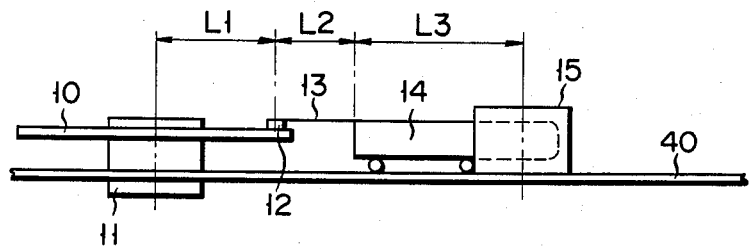
FIG. 2 is an illustration showing a moving mechanism for a magnetic head in the apparatus of FIG. 1.

A magnetic head positioning control apparatus, according to an embodiment of the present invention, in a magnetic disk apparatus will now be described in detail with reference to the accompanying drawings.

FIG. 1 is a block diagram of a magnetic head positioning control apparatus adopting a servo index method, according to an embodiment of the present invention. The apparatus of this embodiment comprises magnetic head position detecting unit 2, thermal offset value determination unit 4, and magnetic head driving unit 6.

Referring to FIG. 1, magnetic head position detecting unit 2 has magnetic head 12 which accesses disk 10 rotated by spindle motor 11, and reads servo data SD if positional correction is necessary. The data signal read by magnetic head 12 is amplified by amplifier 16, and is supplied to peak value holding circuit 17. Timing pulse generator 19 fetches a timing signal synchronous with rotation of spindle motor 11, and supplies control timing pulse PHCK to circuit 17. In response to timing pulse PHCK, circuit 17 holds the signal, corresponding to the servo data, output from amplifier 16 and supplies it to subtracter 18. Subtracter 18 then produces a signal corresponding to a difference between two peak values.

Thermal offset value determination unit 4 comprises A/D converter 20 for converting an analog signal corresponding to the difference output from subtracter 18 to a digital signal, microprocessor (CPU) 21 for determining thermal off-track values at respective track positions in accordance with a program stored in a ROM (not shown), and determining a thermal offset value corresponding to thermal off-track of a target track position, RAM 22 for storing data under the control of CPU 21, D/A converter 24 for converting the thermal offset value determined by CPU 21 into analog data, or a correction current, and timer 30, which is provided if necessary, for managing time lapse after the magnetic head position is corrected.

Magnetic head driving unit 6 comprises stepping motor 15 for changing the position of magnetic head 12 through head arm 13 of carriage 14, driver controller 25 for receiving the correction current from D/A converter 24 to determine a driving current for driving stepping motor 15, and driver 26 for driving stepping motor 15 in response to the driving current from controller 25.

The operation of the magnetic head positioning apparatus according to the present invention will now be described.

First, the cause of thermal off-track and the principle of the present invention will be described.

Thermal off-track on a target track position occurs for the following reason. As shown in FIG. 2, spindle motor 11 and stepping motor 15 are fixed onto base 40. Carriage 14 is driven by stepping motor 15. Magnetic head 12 is fixed to head arm 13 of carriage 14. Head arm 13 includes a suspension for supporting magnetic head 12, and a head arm section for supporting the suspension. Disk 10 is fixed to spindle motor 11 and is rotated thereby. With this mechanism, an amount of thermal off-track ST as a shift of magnetic head 12 relative to a target track position on disk 10 is expressed by equation (1):

$$ST = L1 \times (\Delta L - \Delta L0) \times t - L2 \times (\Delta L2 - \Delta L0) \times t - L3 \times (\Delta L3 - \Delta L0) \times t \quad (1)$$

where t is a temperature difference between a current temperature and a reference temperature; $\Delta L0$ is a linear expansion coefficient of base 40; $\Delta L1$, $\Delta L2$, and $\Delta L3$ are respectively linear expansion coefficients of disk 10, head arm 13, and carriage 14; and L1, L2, and L3 are respectively a distance between the central axis of spindle motor 11 and magnetic head 12, a distance between magnetic head 12 and the distal end of carriage 14, and a distance between the distal end of carriage 14 and the center of stepping motor 15, at a reference temperature.

As can be seen from equation (1), thermal off-track occurs due to a difference between the expansion or contraction of disk 10 and a variation in position of thermal head 12, i.e., a difference between expansion or contraction of carriage 14 and head arm 13, caused by heat radiation from the apparatus.

In equation (1), L1 and L3 at the reference temperature vary in accordance with the track position, but L2 is fixed. Therefore, if a target track on disk 10 is indicated by T, L1 and L3 can be respectively expressed by:

$$L1 = a + bT$$

$$L3 = c + dT$$

If these are substituted in equation (1), thermal off-track ST at the target track position on disk 10 is expressed by equation (2) below:

$$ST = A(t) + B(t) \times T \quad (2)$$

More specifically, thermal off-track ST can be expressed by a linear equation consisting of constant term A(t), which depends on temperature but is independent of the track position, and B(t)T, which depends on both the temperature and the track position. Coefficient B(t) is temperature dependent. Therefore, when terms A(t) and B(t) are time-serially obtained with respect to temperature variations, thermal off-track with respect to track T can always be estimated.

Since there is a linear relationship between the above-mentioned thermal off-track and the difference between the peak values corresponding to servo data SD, thermal offset value $\Delta x$ can be given by equation (3):

$$\Delta x = C(t) + D(t) \times T \qquad (3)$$

The correction current $\Delta I$, through which stepping motor 15 is controlled to correct the thermal off-track at the target track expressed by the thermal offset value $\Delta X$ of the equation (3), is expressed by equation (4) below:

$$\Delta I = E(t) + F(t) \times T \qquad (4)$$

From equation (4), when values of E and F, which vary in accordance with temperature, are successively monitored, correction current $\Delta I$ at an any track position can be corrected in advance.

Figure 6:
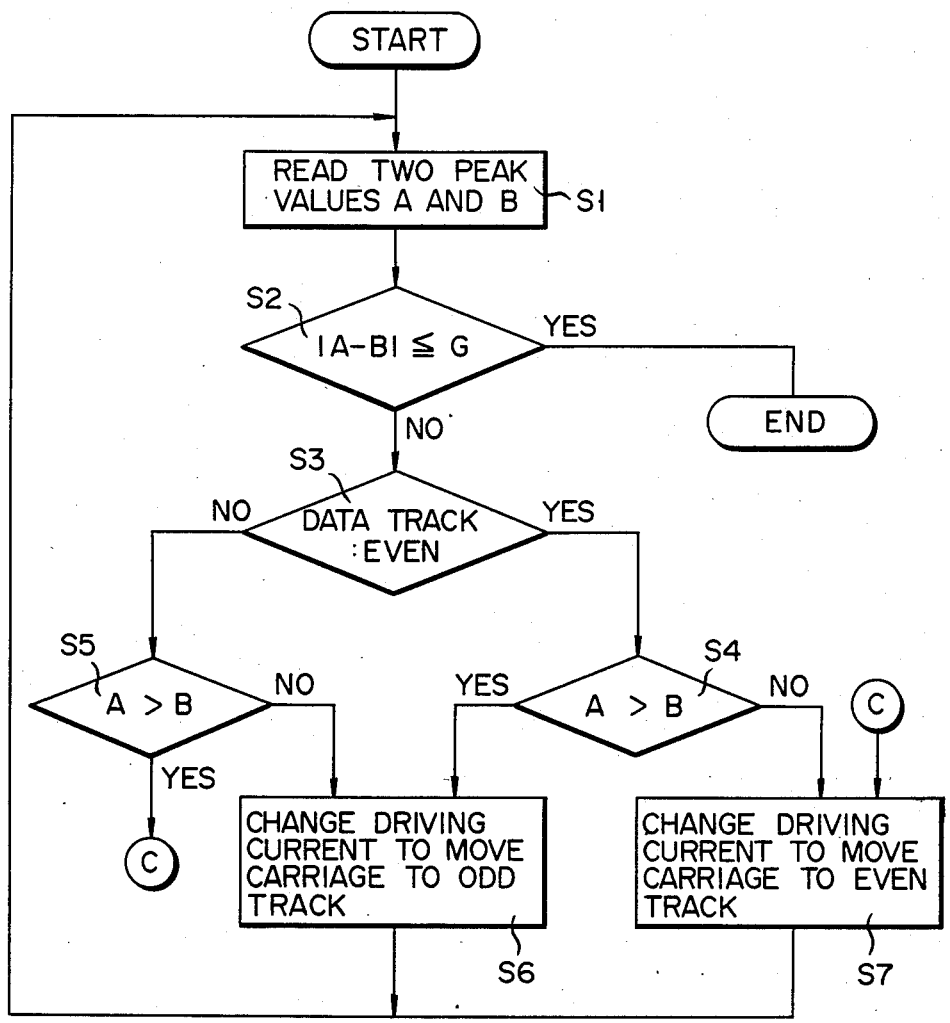
FIG. 6 is a flow chart for explaining processing for obtaining a thermal offset value.

The operation for correcting thermal off-track utilizing the above principle in the magnetic head positioning apparatus of the present invention will now be described with reference to FIGS. 6, 7A and 7B.

In step 11 of FIG. 7A, the magnetic disk apparatus is turned on, thereby the magnetic head positioning apparatus is also turned on. At this time, since the thermal off-track is already occurred, it is necessary to correct the position of magnetic head 12. For this reason, the correction is performed in the following steps. In step 12, predetermined first and second tracks to be sought are designated so that the first track is as inner as possible, the second track is as outer as possible. Step 14 is executed after timer 30 is reset in step 13. In step 14, the correction current $\Delta I$ is determined corresponding to the thermal offset value $\Delta x$ at the first data track specified in step 12. The operation of determining the correction current $\Delta I$ will be described with reference to FIGS. 3 to 6.

Figure 3:
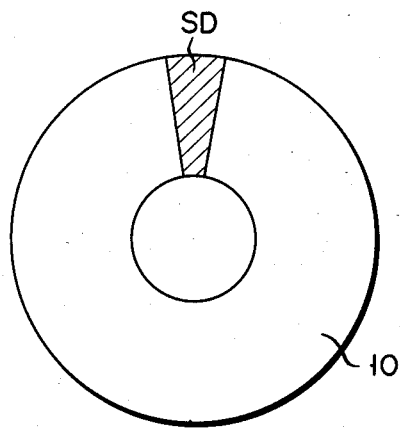
FIG. 3 is an illustration showing a disk having a servo index.

As shown in FIG. 3, servo data SD is recorded on disk 10. Disk 10 is rotated by spindle motor 11. Magnetic head 12 is supported by carriage 14 through head arm 13. When carriage 14 is driven by stepping motor 15, head 12 can perform a seek operation on disk 10. Servo data SD is read by magnetic head 12, and is amplified by amplifier 16. Amplifier 16 may incorporate an automatic gain control circuit, which controls the gain to correspond with respective track positions in order to prevent a change in peak values of the servo data signals read by head 12 for different track positions.

Timing pulse generator 19 generates a pulse signal shown in FIG. 5D. The signals corresponding to servo data SD output from amplifier 16 are held by peak value holding circuit 17 in response to periods A and B of a pulse PHCK from generator 19 (step S1, FIG. 6). Subtracter 18 calculates a difference between the peak values held in circuit 17, and outputs it (step S2).

Figure 4:
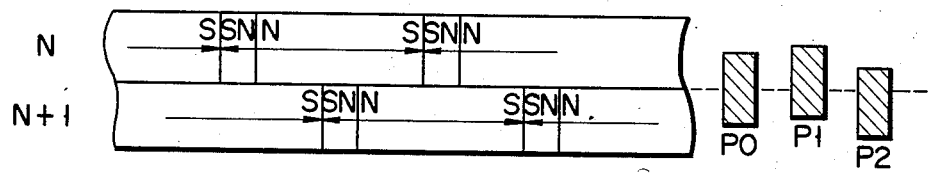
FIG. 4 is an enlarged view showing the relative positional relationship between the servo index of the disk of FIG. 3 and the magnetic head.
Figure 5:
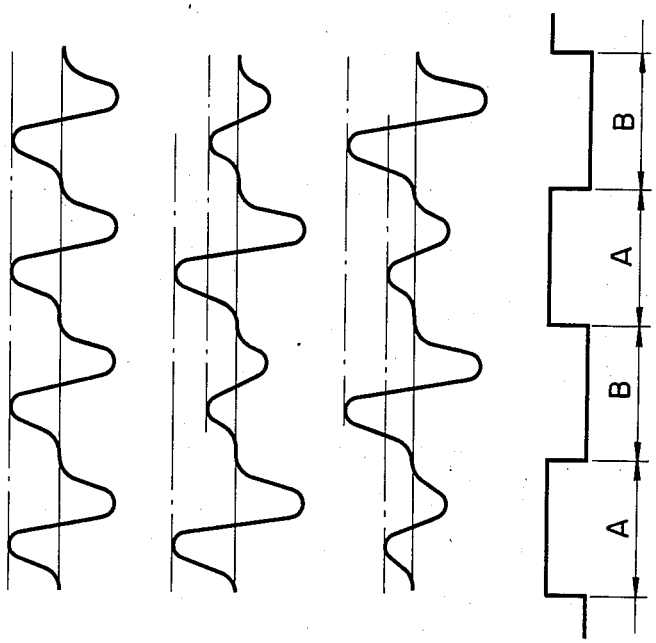
FIGS. 5A to 5C are timing charts of detection signals when the magnetic head is at respective positions shown in FIG. 4.
FIG. 5D is a timing chart of timing signal for holding the signals shown in FIGS. 5A to 5C.

As shown in FIG. 4, when magnetic head 12 is at position P0 with respect to Nth and (N+1)th servo tracks of disk 10, the signal corresponding to servo data SD has a waveform shown in FIG. 5A. More specifically, the two peak values held in response to the periods A and B are equal to each other, and it is seen therefrom that the thermal off-track is appropriately corrected. Therefore, there is no need to perform correction.

However, if temperature varies, thermal off-track occurs as expressed by equation (1), and position of magnetic head 12 relative to the data track of disk 10 is deviated to, e.g., position P1 or P2 shown in FIG. 4. The two peak values held in circuit 17 in response to periods A and B of pulse signal PHCK from generator 19 are therefore different from each other, as shown in FIG. 5B or 5C.

When it is determined in step S2 that the output of differential amplifier 18 is larger than a predetermined value G, step S3 is executed. In step S3, it is checked if magnetic head 12 is currently positioned on an even data track. If Y in step S3, step S4 is executed, if N then step S5 is executed. In step S4, the peak values of the signals held in response to periods A and B of signal PHCK are compared with each other. As a result, CPU 21 determines a movement direction of magnetic head 12 in accordance with the absolute value and the polarity of the difference between the peak values. When magnetic head 12 is at position P1, the peak value corresponding to period A is larger than that corresponding to period B. At this time, Y is obtained in step S4, and the flow advances to step S6. On the contrary, when the peak value corresponding to period B is larger, step S7 is executed.

More specifically, referring to FIG. 4, if N is an even number, CPU 21 determines a correction current value $\Delta I$ to move head 12 toward an odd track in step S6. Alternatively, in step S7, CPU 21 determines a correction current value $\Delta I$ to move head 12 toward an even track. The determined correction current value is supplied to driver controller 25, and is converted into a driving current, thus being supplied to stepping motor 15. Thereby, positional control of magnetic head 12 is executed.

Upon another rotation of disk 10, the difference between peak values is again detected, and CPU 21 performs another peak value discrimination. In this way, a final correction current value is determined.

If N in step S3, then step S5 is executed. In step S5, the same operation as shown in step S4 is performed to move magnetic head 12. As a result, step S6, or S7 is executed.

Thus, the first correction current $\Delta I$ at the first track position is determined in step S14 of FIG. 7A. Step S15 is successively executed to determine a second correction current $\Delta I$ at the second track position after magnetic head 12 is sought to the track position specified in step S12. In step S16, values of variables E and F dependent on temperature in the equation (4) are calculated based on the first correction current $\Delta I$ and the first track position T determined in step S14 and the second correction current $\Delta I'$ and the second track position T' determined in step S15. The calculated values of variables E and F are stored in RAM 32. Also, $\Delta I'$ are stored in RAM 32 as $\Delta I$ and T' as T.

In step 17, it is checked if a count value of timer 30 reaches a predetermined value. If Y, step S12 executed, if N, step S18 is executed. A purpose of step S17 will be described later. In step S18, it is checked if a seek instruction is given from magnetic desk controller (not shown). If Y in step S18, step S20 in FIG. 7B is executed, if N then step S19 is executed. In step S19, timer is counted up, and then step S17 is executed again.

When the seek instruction is not generated and the count of timer 30 reaches the predetermined value, step S12 is executed again to calculate new values of variables E and F since the amount of the thermal off-track varied as temperature with the laspe of time.

Figure 7B:
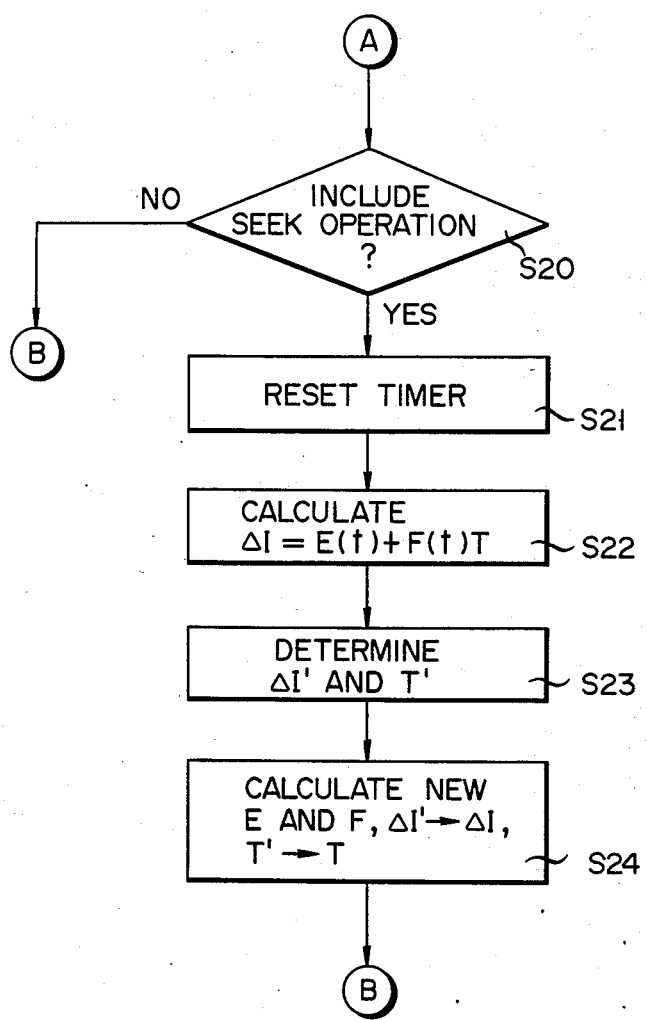

It is checked if the seek operation is included in a seek instruction from the magnetic disk controller in step S20 of FIG. 7B. When N in step S20, i.e. a track position specified by the seek instruction is the data track currently positioned by magnetic head 12, it is not necessary to calculate new values of variables E and F. Therefore, the flow is advanced to step S17.

If Y in step S20, step S21 is executed to reset timer 30. In step S22, the correction current ΔI is calculated from equation (4) using the values of the variables E and F stored in RAM 32 in step 16. Then, the seek operation is performed according to the seek instruction and magnetic head 12 is positioned in the designated track. At this time, the thermal off-track at the designated track is corrected by applying the correction current calculated in step S22 to stepping motor 15. The operation shown in FIG. 6 is performed to obtain the final correction current ΔI' at the designated track. The same step S24 as step S16 executed, and new values of variables E and F is calculated from equation (4) using ΔI and T stored in RAM 32 and ΔI' and T' obtained in step S23. Variables E and F is updated by the storage of new values in RAM 32. Also, ΔI' is stored in RAM 32 as ΔI, and T' as T. Then step S17 is executed. The following operations are the same as described above.

Thus, the correction current ΔI is calculated prior to the seek operation to correct the thermal off-track on a magnetic head and a driving current in accordance with the correction current ΔI is applied to a stepping motor. Therefore, when the seek operation is completed, since the magnetic head is correctly positioned for the thermal off-track, it is immediately possible to read/write data.

What is claimed is:

1. A magnetic head positioning control apparatus using servo index data, comprising:
   detecting means for detecting two peak values corresponding to servo data with respect to a current data track position on a disk by a magnetic head, and for outputting data corresponding to a difference between the two peak values;
   magnetic head driving means for determining a driving current value according to an input correction current value and for displacing a position of said magnetic head in the current data track position based on the driving current value; and
   correction value output means for outputting to said magnetic head driving means one of the correction current values according to the data corresponding to the difference to determine a final correction current value at the current track position and the correction current value calculated from a relation between the final correction current value and the track position in response to an input seek instruction, for driving said detecting means in response to an output of the correction current value, and for determining the relation using the final correction current values and the track positions.

2. The apparatus according to claim 1, wherein said detecting means comprises:
   amplifying means for reading the servo data with respect to the current data track position on the disk by said magnetic head;
   pulse generating means for generating a timing pulse responsive to a signal synchronous with rotation of the disk;
   holding means for holding and outputting the two peak values received from said amplifying means in response to the timing pulse; and
   subtracting means for receiving the two held peak values from said holding means to generate the data corresponding to the difference.

3. The apparatus according to claim 1, wherein said magnetic head driving means comprises:
   driving control means for determining and outputting the driving current value based on the correction current value from said correction value output means; and
   first driving means for displacing the position of said magnetic head based on the driving current.

4. The apparatus according to claim 1, wherein said correction value output means comprises:
   correction value calculation means for calculating the correction current value at the designated track position by the seek instruction using the relation and for outputting the calculated correction current value to said magnetic head driving means;
   correction value determination means for outputting the correction current value according to the data corresponding to difference at the current data track position to said magnetic head driving means to determine the final correction current value until the data corresponding to the difference is smaller than a predetermined value;
   second driving means for driving said detecting means in response to the output of the correction current value; and
   coefficient calculation means for calculating coefficients in the relation using the final correction current value and the track position from said correction value determination means, and for storing the final correction current value and the track position after calculating.

5. The apparatus according to claim 4, wherein the relation is linear, and
   said correction value determination means includes means for setting the final correction current value to a first final correction current value at a first track position, and
   said coefficient calculation means includes means for calculating the two coefficients in the linear relation between the final correction current value and the tracking position using the first final correction current value and the first track position from said correction value determination means and a stored second final correction current value at a stored second track position, and for storing the first final correction current value as the second final correction current value and the first track position as the second track position after calculating.

6. The apparatus according to claim 5, further comprising means for checking if a seek operation is included in the seek instruction, and for disabling the operation of said correction value output means responsive to an absence of the seek operation.

7. The apparatus according to claim 5, further comprising:
   track designation means for designating the third and fourth track positions;
   third driving means for driving said track designation means; and
   fourth driving means for driving said correction value determination means at the third track position to store the first final correction current value from said correction value determination means as the second final correction current value and the third track position as the second track position, for driving said correction value determination means at the fourth track position after driving at the third track position, and for driving said coefficient calculation means after driving at the fourth track position in response to a designation of said track designation means.

8. The apparatus according to claim 7, further comprising means for driving said track designation means when the apparatus is turned on.

9. The apparatus according to claim 7, wherein the apparatus further comprises timer means for counting time, and for driving said track designation means when the counted time has passed a predetermined time, and said coefficient calculation means further comprises means for resetting said timer means in response to an operation of said coefficient calculation means.

10. A magnetic head positioning control method using servo index data, comprising:
    performing a first displacement of a magnetic head according to a first calculation of a correction current value in a designated data track position by an input seek instruction using a relation between a final correction current value and the track position;
    performing a first determination of a final correction current value at the designated data track position by further displacing the magnetic head in response to a presence of a thermal off track; and
    performing a second determination of the relation based on the final correction current values.

11. The method according to claim 10, further comprising:
    checking if the seek operation is included in the seek instruction; and
    disabling said first determination in response to an absence of the seek operation.

12. The method according to claim 10, wherein said first determination comprises:
    outputting the correction current value according to a data corresponding to a difference between detected two peak values;
    converting the output correction current value to a driving current value;
    displacing the position of the magnetic head based on the driving current value;
    detecting the two peak values corresponding to servo data with respect to the current data track position on a disk by the magnetic head;
    performing a third determination of data corresponding to the difference; and
    repeating said detection until the data corresponding to the difference is smaller than a predetermined value.

13. The method according to claim 10, wherein said first determination includes setting the final correction current value to a first final correction current value at a first track position, and
    said second determination comprises:
    performing a third determination of the relation using the first final correction current value and the first track position from said first determination and a stored second final correction current value and a stored second track position; and
    storing the first final correction current value as the second final correction current value and the first track position as the second track position.

14. The method according to claim 12, further comprising:
    designating third and fourth track positions in response;
    driving said first determination at the third track position;
    storing the first final correction current value from said first determination as the second final correction current value and the third track position as the second track position;
    driving said first determination at the fourth track position after driving at the third track position; and
    driving said second determination after driving at the fourth track position.

15. The method according to claim 13, further comprising driving said designation in response to turning on.

16. The method according to claim 14, wherein the method further comprises:
    counting time to drive said designation when the counted time has passed a predetermined time, and
    said second determination further comprises resetting the counted time.

* * * * *